(12) United States Patent
Liu et al.

(10) Patent No.: US 11,964,303 B2
(45) Date of Patent: Apr. 23, 2024

(54) METHODS, DEVICES AND SYSTEMS FOR CARGO SORTING

(71) Applicant: SHENZHEN DORABOT INC., Guangdong (CN)

(72) Inventors: Qiyang Liu, Guangdong (CN); Guillaume Crabé, Guangdong (CN); Hailiang Zhang, Guangdong (CN); Ilia Vasilev, Guangdong (CN); Hongbin Liao, Guangdong (CN); Shimin Xia, Guangdong (CN); Kaixiang Wang, Guangdong (CN); Xinghao Liang, Guangdong (CN); Yuan Li, Guangdong (CN); Jie Shen, Guangdong (CN); Yun Zhao, Guangdong (CN)

(*) Notice: Subject to any disclaimer, the term of this patent is extended or adjusted under 35 U.S.C. 154(b) by 342 days.

(21) Appl. No.: 17/381,540

(22) Filed: Jul. 21, 2021

(65) Prior Publication Data
US 2021/0346914 A1    Nov. 11, 2021

Related U.S. Application Data

(63) Continuation of application No. PCT/CN2020/100677, filed on Jul. 7, 2020.

(30) Foreign Application Priority Data

Jul. 30, 2019    (CN) .......................... 201910706594.0

(51) Int. Cl.
*B07C 3/08* (2006.01)
*B25J 9/16* (2006.01)

(52) U.S. Cl.
CPC ............... *B07C 3/08* (2013.01); *B25J 9/1674* (2013.01); *B25J 9/1687* (2013.01); *B07C 2501/0063* (2013.01)

(58) Field of Classification Search
CPC ..... B07C 3/02; B07C 3/08; B07C 5/36; B25J 9/1674; B25J 9/1687; B25J 15/0014
See application file for complete search history.

(56) References Cited

U.S. PATENT DOCUMENTS 11,180,317 B1* 11/2021 Battles ...................... B25J 15/08
11,318,499 B2* 5/2022 Kalouche ............... B25J 9/1679
(Continued)

FOREIGN PATENT DOCUMENTS

CN    101337353 A    1/2009
CN    109454003 A    3/2019

OTHER PUBLICATIONS

International Search Report of PCT Patent Application No. PCT/CN2020/100677 dated Oct. 12, 2020.

*Primary Examiner* — Joseph C Rodriguez

(57) ABSTRACT

The invention provides a method for cargo sorting, configured to control an end effector with a package placement platform to sort the cargo, and the method includes: moving the package placement platform to a package obtaining position and obtaining the cargo to be sorted that enters into the package placement platform; moving the package placement platform to a package storage location; and exerting a first force to push the cargo into a package storage unit. With the help of the package placement platform, the method of the invention can receive the packages of different types or different sizes or different material so as to sort and transport all kinds of packages.

10 Claims, 11 Drawing Sheets

(56) References Cited

U.S. PATENT DOCUMENTS

| | | | |
|---|---|---|---|
| 11,518,044 B2* | 12/2022 | Liu | B65G 47/90 |
| 11,661,274 B1* | 5/2023 | Patel | B25J 9/0096 |
| | | | 414/278 |
| 2013/0096713 A1* | 4/2013 | Takizawa | B25J 15/0616 |
| | | | 700/224 |
| 2020/0087082 A1* | 3/2020 | Schaarschmidt | B65G 47/92 |
| 2020/0238534 A1* | 7/2020 | Goldberg | B25J 9/0093 |
| 2020/0269283 A1* | 8/2020 | Ulrich | B07C 3/08 |
| 2021/0155409 A1* | 5/2021 | Haid | B65G 65/00 |
| 2021/0260626 A1* | 8/2021 | Marseglia | B65G 21/12 |
| 2022/0017316 A1* | 1/2022 | Tiwary | B65H 3/047 |
| 2022/0411190 A1* | 12/2022 | Ogawa | G06Q 10/083 |
| 2023/0066277 A1* | 3/2023 | Zhan | B25J 9/023 |

* cited by examiner

METHODS, DEVICES AND SYSTEMS FOR CARGO SORTING

RELATED APPLICATION

This application is a Continuation Application of PCT Application No. PCT/CN2020/100677 filed on Jul. 7, 2020, which claims priority to China Patent Application No. CN201910706594.0, filed on Jul. 30, 2019, and entitled "METHODS, DEVICES AND SYSTEMS FOR CARGO SORTING", which is incorporated herein by reference in its entirety.

FIELD OF THE INVENTION

The invention relates generally to the field of robotics, and in particular to a method, a device and a system for cargo sorting.

BACKGROUND OF THE INVENTION

In the automation of the logistics industry, industrial robots can perform the sorting of goods. The end of the robot arm of the industrial robot is equipped with an end effector which is configured to perform the pick-up and placing operation of the goods. Existing end effectors have various structures such as suction cups, claws, dexterous hands, and other special structures for specific items.

However, in the process of package sorting, it is found that the diversity of package categories is inevitable for the cargo sorting system, while the end effector of existing robots can just only grasp a cargo of certain type or specific size or specific material.

SUMMARY OF THE INVENTION

The purpose of this invention is to provide with a method, a device and a system for cargo sorting, and provide the method capable of sorting cargoes of various sizes and shapes.

In accordance with an aspect of the invention, a method for cargo sorting, configured to control an end effector with a package placement platform to sort the cargo, and the method includes: moving the package placement platform to a package obtaining position and obtaining the cargo to be sorted that enters into the package placement platform; moving the package placement platform to a package storage location; and exerting a first force to push the cargo into a package storage unit.

By adopting the above technical solutions, with the help of the package placement platform, the method of the invention can receive the packages of different types or different sizes so as to sort and transport all kinds of packages.

In accordance with another aspect of the invention, a device for cargo sorting, configured to control an end effector with a package placement platform to sort the cargo, the device comprises: a first collection unit, configured to collect location information of the cargo; a second collection unit, configured to collect cargo location information and space information of a package storage unit; and a processing unit, configured to execute the method as claimed above.

By adopting the above technical solutions, with the help of the package placement platform, the device of the invention can receive the packages of different types or different sizes so as to sort and transport all kinds of packages.

In accordance with another aspect of the invention, a computer readable storage medium, comprising: computer program codes stored on the computer readable storage medium, when the computer program codes run on the computer, the computer executes the method as claimed above.

In accordance with another aspect of the invention, a robot, comprising: an end effector, a robot arm, a memory and a processor; and the end effector, configured to receive a cargo; the robot arm, configured to move the end effector; the memory, configured to storage a program; and the processor configured to call the program to execute the method as claimed above.

By adopting the above technical solutions, with the help of the package placement platform, the robot of the invention can receive the packages of different types or different sizes so as to sort and transport all kinds of packages.

In accordance with another aspect of the invention, a system for cargo sorting, comprising: a robot, a collection unit, a package storage unit, a conveyor, a memory and a processor; and the robot, configured to sort the cargo; the collection unit, configured to collect information; the package storage unit, configured to store the cargo; the conveyor, configured to transport the cargo; the memory, configured to storage a program; and the processor, configured to call the program to execute the method as claimed above.

By adopting the above technical solutions, with the help of the package placement platform, the system of the invention can receive the packages of different types or different sizes so as to sort and transport all kinds of packages.

BRIEF DESCRIPTION OF THE DRAWINGS

The embodiments described below with reference to the drawings are intended to explain the present invention and not to limit the scope of the present invention.

DETAILED DESCRIPTION OF THE INVENTION

Figure 1:
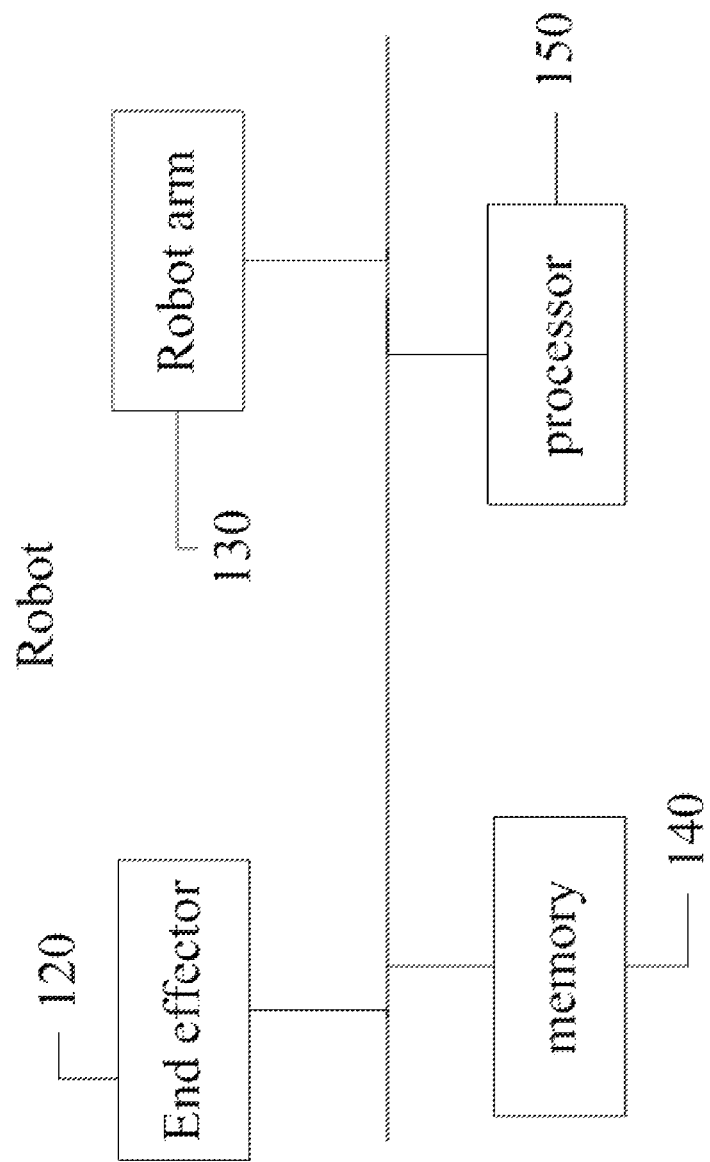
FIG. 1 is a structural schematic diagram of a robot according to an embodiment of the present invention.

In order to make the purpose, technical solutions and advantages of the implementations of the present invention much clearer, the technical solution of the present invention will be described in more detail below with reference to the accompanying drawings.

It should be noted that in the drawings, the same or similar reference numerals are used to refer to the same or similar elements or elements having the same or similar functions. The described implementations are part of the implementations of the invention and not all of the implementations. In the case of no conflict, the implementations of the present invention and the features in the implementations may be combined with each other. It will be apparent to those skilled in the art that other implementations may be obtained in accordance with the structures illustrated in the implementations of the invention without departing from the scope of the invention.

Figure 2:
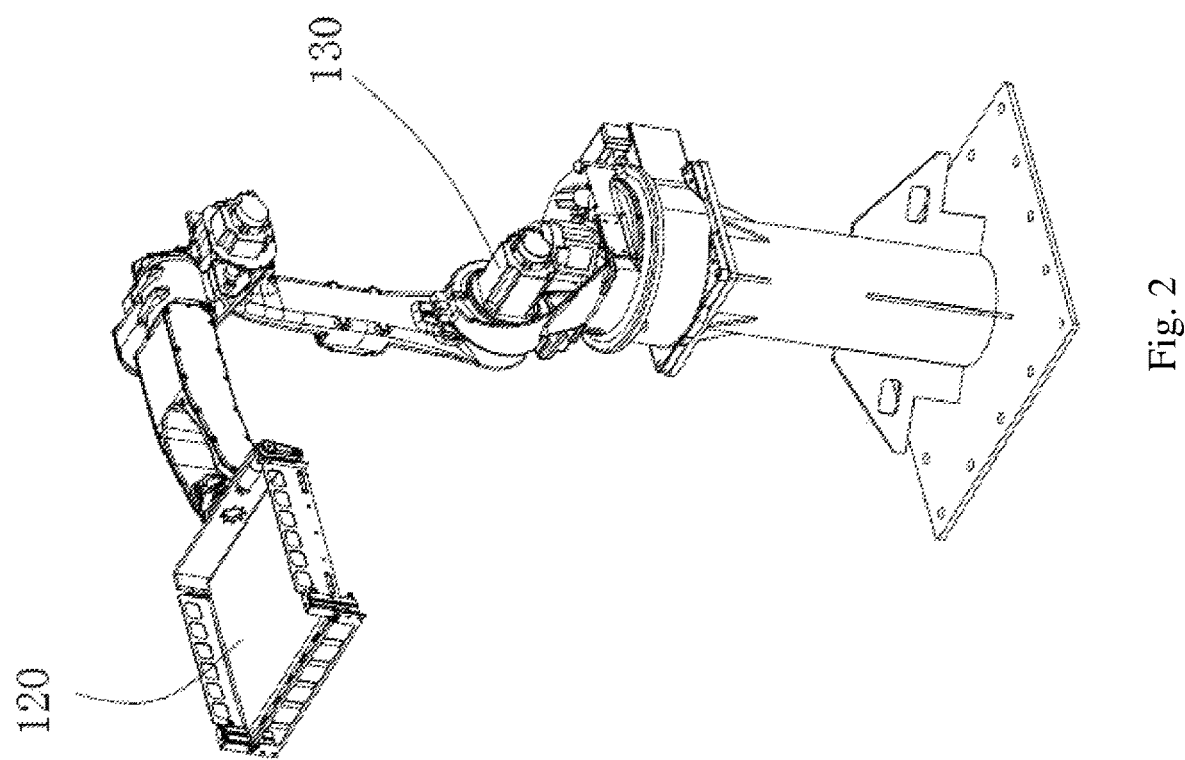
FIG. 2 is a three-dimensional structure schematic diagram of the robot, and a memory and a processor are not shown.

Referring to FIG. 1 and FIG. 2, the figures are the structural schematic diagrams of a robot provided by the present invention. The robot mainly comprises: an end effector 120, a robot arm 130, a memory 140, and a processor 150.

The end effector 120 is configured to receive cargoes, the end effector 120 provided by this embodiment can receive the packages of different types or different sizes. The end effector 120 provided by some embodiments comprises a mounting portion and an execution portion, and the execution portion includes at least a package placement platform configured to movably coupled to the mounting portion. The package placement platform is configured to receive cargoes of different types or different sizes.

In some implementations, a fixed baffle plate is arranged on at least one side of the package placement platform. In order to reduce the weight of the end effector, part or all of the fixed baffle plate is configured to be a hollow structure.

In some implementations, a movable baffle plate is arranged on a front side of the package placement platform to avoid a package falling off the package placement platform while the end effector is moving.

In some implementations, the package placement platform is configured as a conveying platform. More specific, two sides of the conveying platform are respectively provided with rotating wheels and a conveyor belt is sleeved both on the rotating wheels in order to exert a force to push the cargo into a package storage unit when sorting the cargo. Moreover, the package placement platform is connected with the mounting portion by a convey mechanism, for facilitating the adjustment of the position of the package on the package placement platform. After the conveying platform has received the package, the conveying platform transports the package from the front end of the package placement platform to the rear end of the package placement platform, which avoids the package falling off the receiving position during the transportation. And meanwhile when the package is sorted to the corresponding destination, the conveying platform provides a driving force to place the package at the destination bin.

In some implementations, the package placement platform is moved to a package obtaining position to obtain the cargo to be sorted. Then, the package placement platform is moved to a package storage location, and the conveying platform exerts a first force to push the cargo into a package storage unit.

Moreover, the robot arm 130 is configured to move the end effector 120, the memory 140 is configured to store program and, and the processor 150 is configured to call the program stored in the memory to control the robot to receive and transport the cargo.

Figure 3:
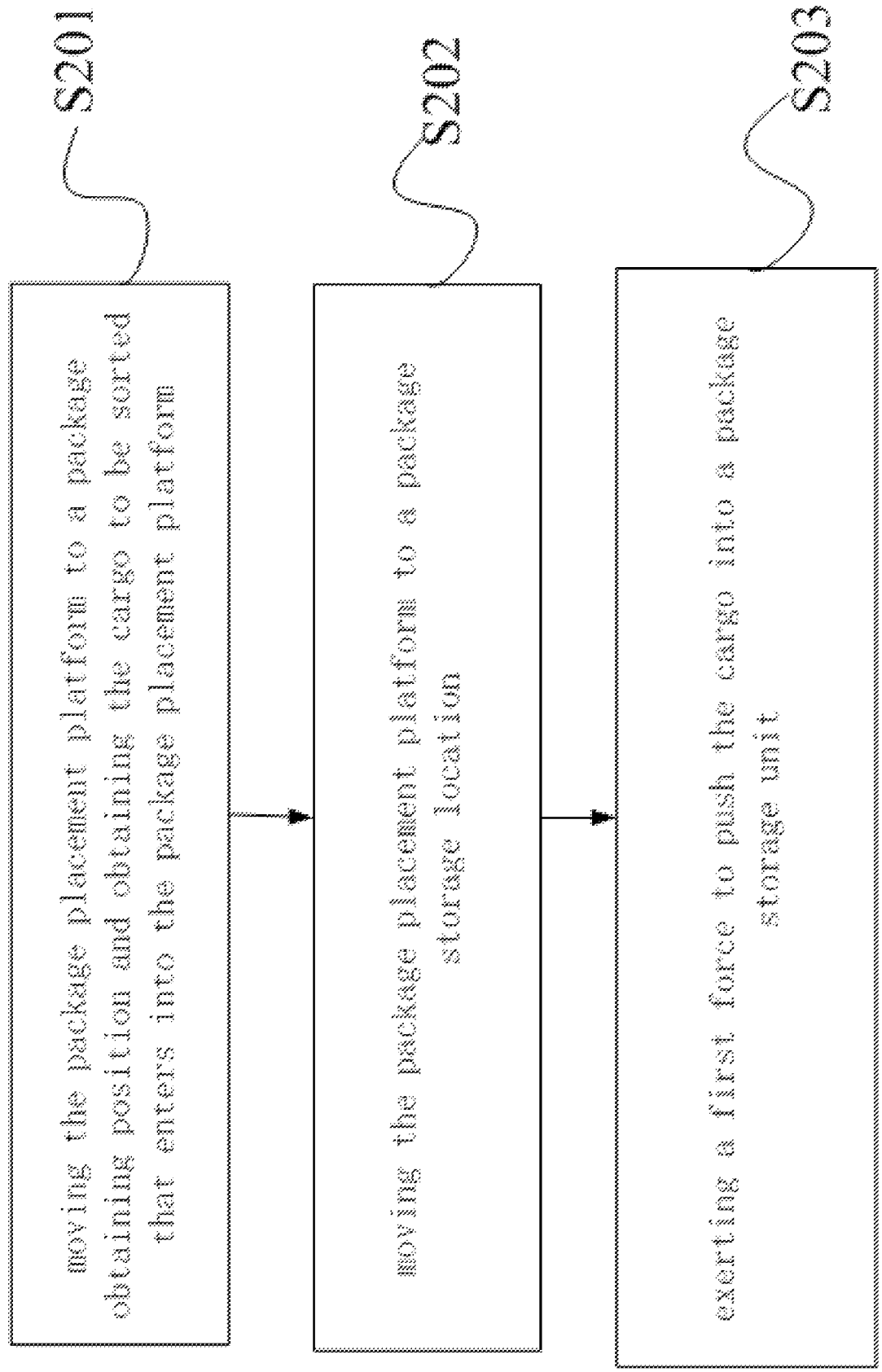
FIG. 3 is a flow schematic diagram of a method for cargo sorting according to an embodiment of the present invention.

Based on the above embodiment, referring to FIG. 3, a method for cargo sorting further provided by this embodiment is configured to control an end effector with a package placement platform to sort the cargo, and the method includes the following steps:

201, moving the package placement platform to a package obtaining position and obtaining the cargo to be sorted that enters into the package placement platform;

202, moving the package placement platform to a package storage location;

203, exerting a first force to push the cargo into a package storage unit.

In some implementations, the information of the cargo can be obtained in advance through a scan device and determining the position of the cargo after the cargo has been sorted based on analyzing the information of the cargo.

More specific, the robot arm moves the end effector to the package storage location based on the information of the cargo.

Figure 4:
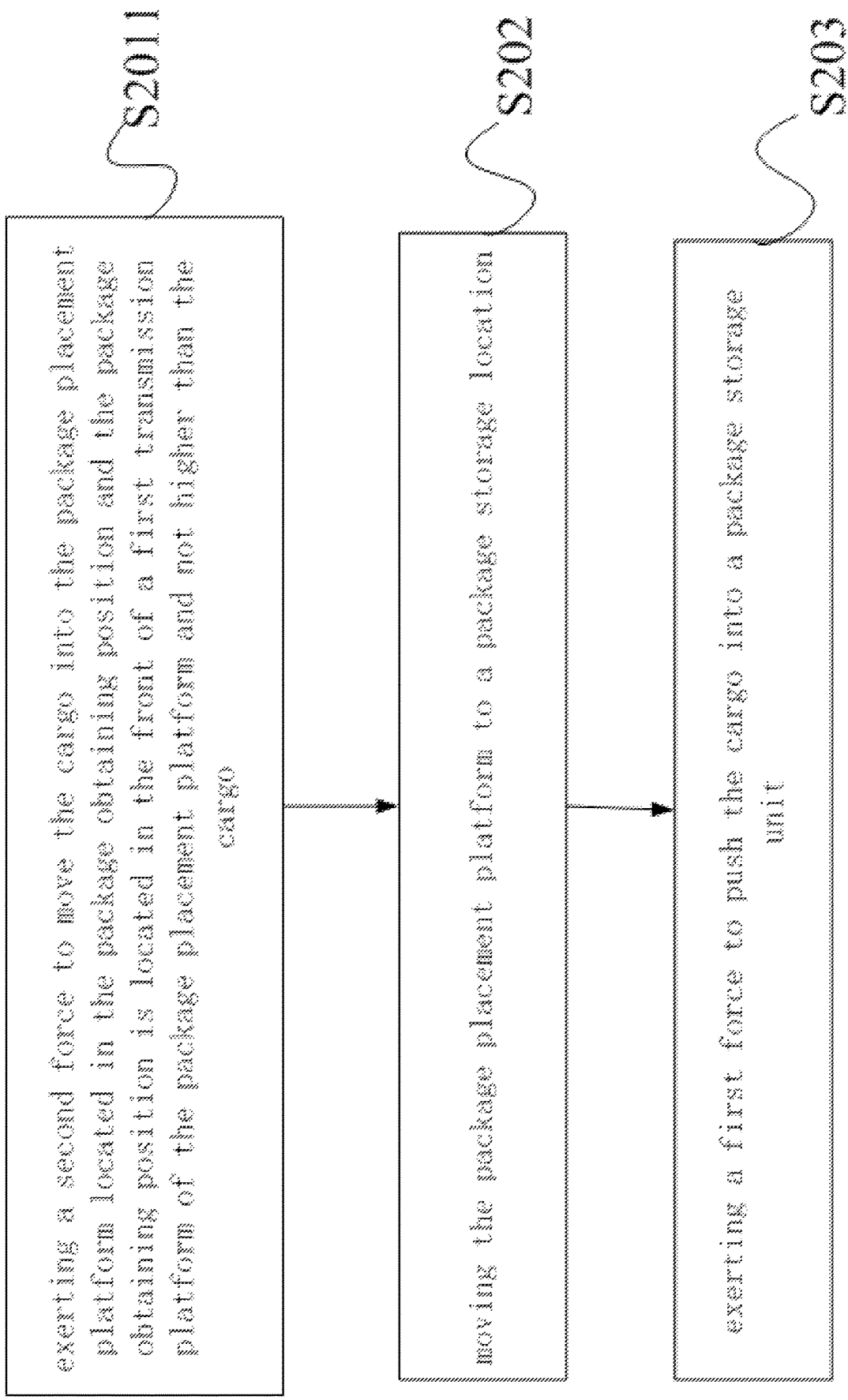
FIG. 4 is a flow schematic diagram of the cargo to be sorted that enters into a package placement platform according to an embodiment of the present invention.

In some implementations, referring to FIG. 4, in the step 201, obtaining the cargo to be sorted that enters into the package placement platform further includes:

2011: exerting a second force to move the cargo into the package placement platform located in the package obtaining position and the package obtaining position is located in the front of a first transmission platform of the package placement platform and not higher than the cargo.

In some implementations, in the step 201, exerting the second force to move the cargo further includes:

2012: controlling the first transmission platform to transport the cargo to be sorted until the cargo slides into the package placement platform.

In some implementations, the front side and the rear side of the first transmission platform are respectively equipped with a sensor to detect the position of the cargo on the package placement platform. A first sensor is arranged at the front side of the first transmission platform and a second sensor is arranged at the rear side of the first transmission platform.

More specific, when the package placement platform is located at the package obtaining position, a controlling system actives the first transmission platform to receive the cargo into the package placement platform. After the cargo enters into the front side of the first transmission platform, the first sensor can detect the cargo located on the package placement platform and the first sensor feeds back a detection signal to the controlling system so that the controlling system controls the first transmission platform to transport the cargo until the second sensor detects the cargo. Then the controlling system controls the first transmission platform stopping transportation when the second sensor feeds back another detection signal to the controlling system.

Through the above steps, the method can place the cargo to be sorted on the first transmission platform of the package placement platform and exert the second force to move the cargo into the package placement platform located in the package obtaining position, which can facilitate the package placement platform receiving the cargo.

Figure 5:
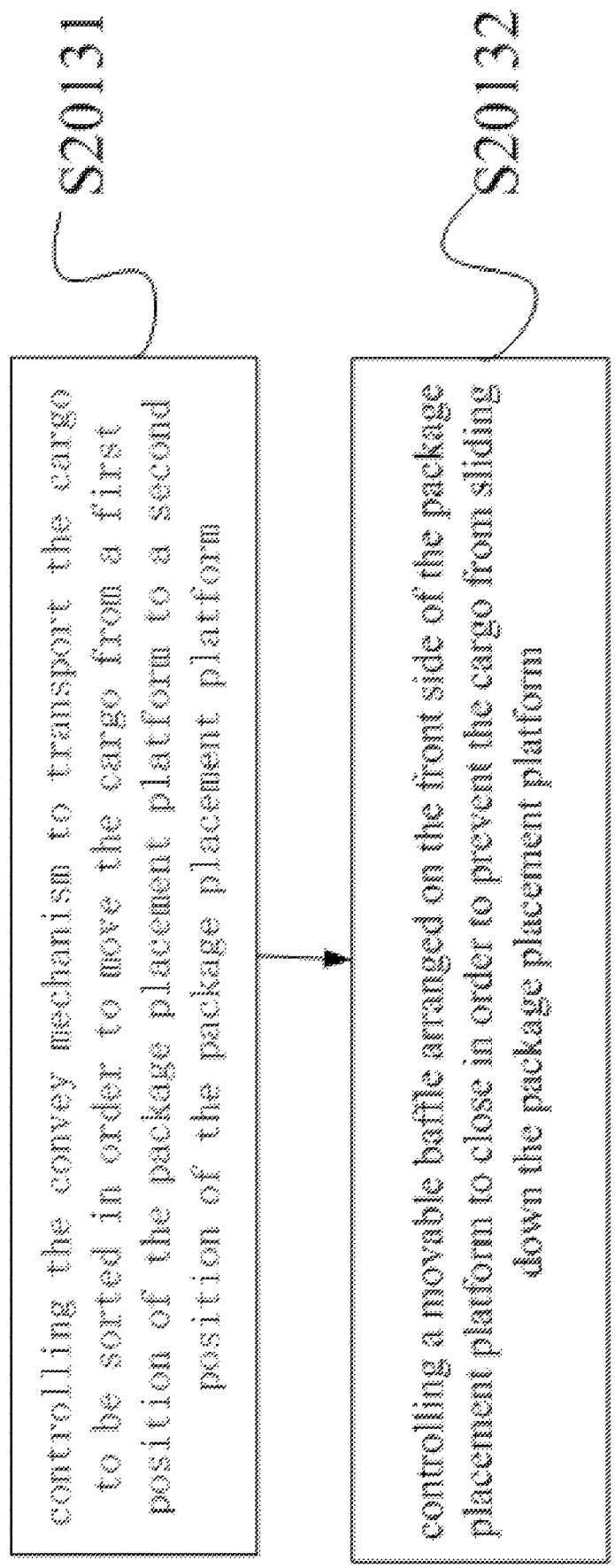
FIG. 5 is a flow schematic diagram of the cargo to be sorted that is already placed on a package placement platform according to an embodiment of the present invention.

In some implementations, referring to FIG. 5, in the step 2013, after obtaining the cargo to be sorted that enters into the package placement platform, the method further includes:

20131: controlling the convey mechanism to transport the cargo to be sorted in order to move the cargo from a first position of the package placement platform to a second position of the package placement platform.

20132: controlling a movable baffle arranged on the front side of the package placement platform to close in order to prevent the cargo from sliding down the package placement platform.

Through the above steps, the method can transport the cargo from a first position of the package placement platform to a second position of the package placement platform by the convey mechanism, that is, the method can move the cargo from the front side of the package placement platform to the rear side of the package placement platform, which can avoid the cargo sliding down from the package placement platform.

Figure 6:
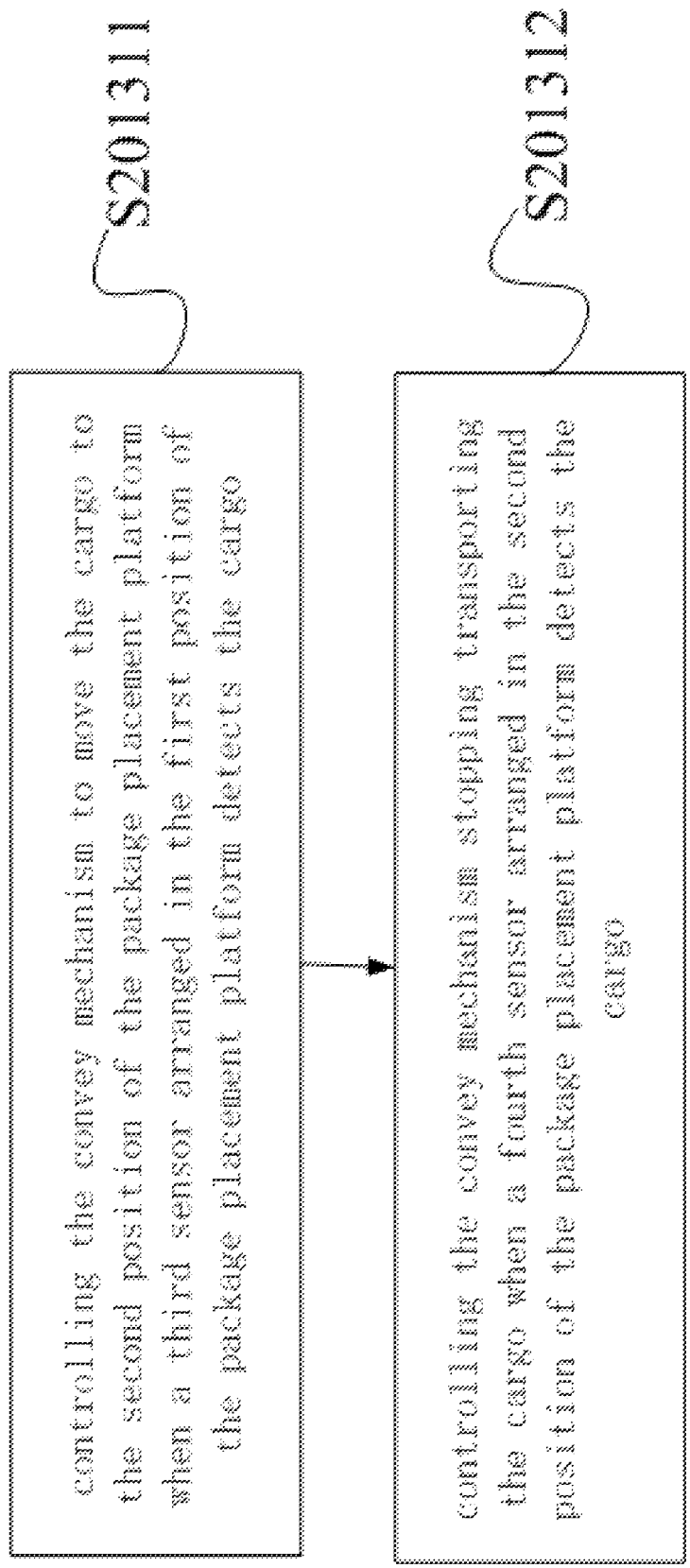
FIG. 6 is a flow schematic diagram of the cargo of which a position is moved on the package placement platform according to an embodiment of the present invention.

In some implementations, referring to FIG. 6, in the step 20131, moving the cargo from the first position of the package placement platform to the second position of the package placement platform further includes:

201311: controlling the convey mechanism to move the cargo to the second position of the package placement platform when a third sensor arranged in the first position of the package placement platform detects the cargo;

201312: controlling the convey mechanism stopping transporting the cargo when a fourth sensor arranged in the second position of the package placement platform detects the cargo.

More specific, when the cargo to be sorted enters into the package placement platform, the third sensor can detect the cargo and feeds back a detection signal to the controlling system, the controlling system controls the convey mechanism to transport the cargo to the rear side of the package placement platform until the fourth sensor detects the cargo. Then the controlling system controls the convey mechanism stopping transportation when the fourth sensor feeds back another detection signal to the controlling system. That is, the convey mechanism moves the cargo from the first position of the package placement platform to the second position of the package placement platform while the movable baffle is controlled to move up to close.

Through the above steps, the method can control the convey mechanism to activate and stop transportation based on the feedback signal through the sensor detecting the position of the cargo. In this manner, it can determine the position of the cargo and control the cargo transportation precisely.

Figure 7:
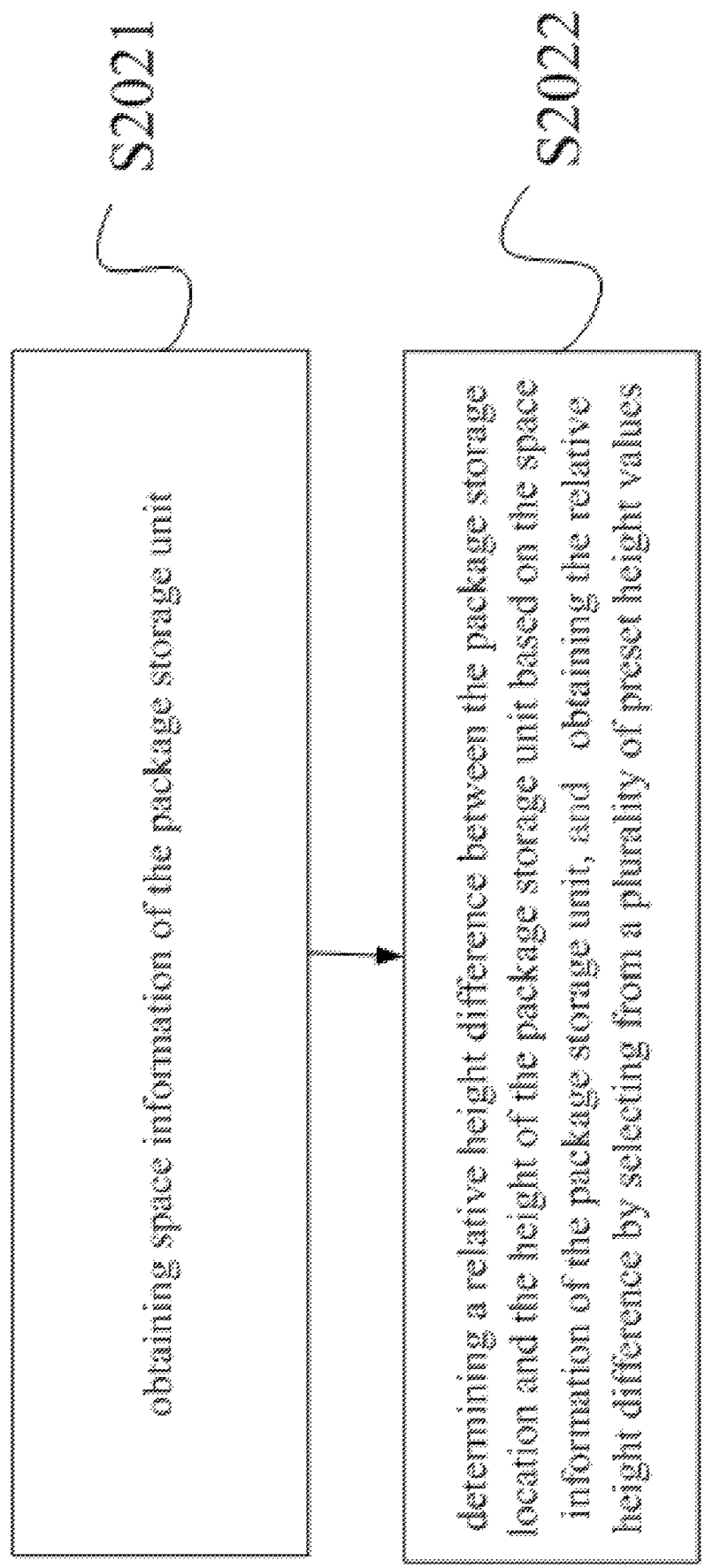
FIG. 7 is a flow schematic diagram of a package placement platform obtaining the information of the storage space according to an embodiment of the present invention.

In some implementations, referring to FIG. 7, in the step 202, the method further includes:

2021: obtaining space information of the package storage unit;

2022: determining a relative height difference between the package storage location and the height of the package storage unit based on the space information of the package storage unit. Moreover, obtaining the relative height difference by selecting from a plurality of preset height values.

In some implementations, each storage space of the package storage unit can be divided into an upper layer, a middle layer, and a lower layer.

More specific, when the cargo to be sorted is transported at the second position of the package placement platform, the controlling system determines one package storage unit to store the cargo according the information of the cargo. After that, it determines the relative height difference between the package storage location and the height of the package storage unit based on obtaining storage space of the package storage unit and each storage space is divided into an upper layer, a middle layer, and a lower layer. In one implementation, the cargoes are placed on the lower layer first, and when the lower layer is full, the cargoes are placed on the middle layer.

Through the above steps, the method can determine a storage position of the cargo to be sorted according the information of the cargo and the storage space of the package storage unit.

Figure 8:
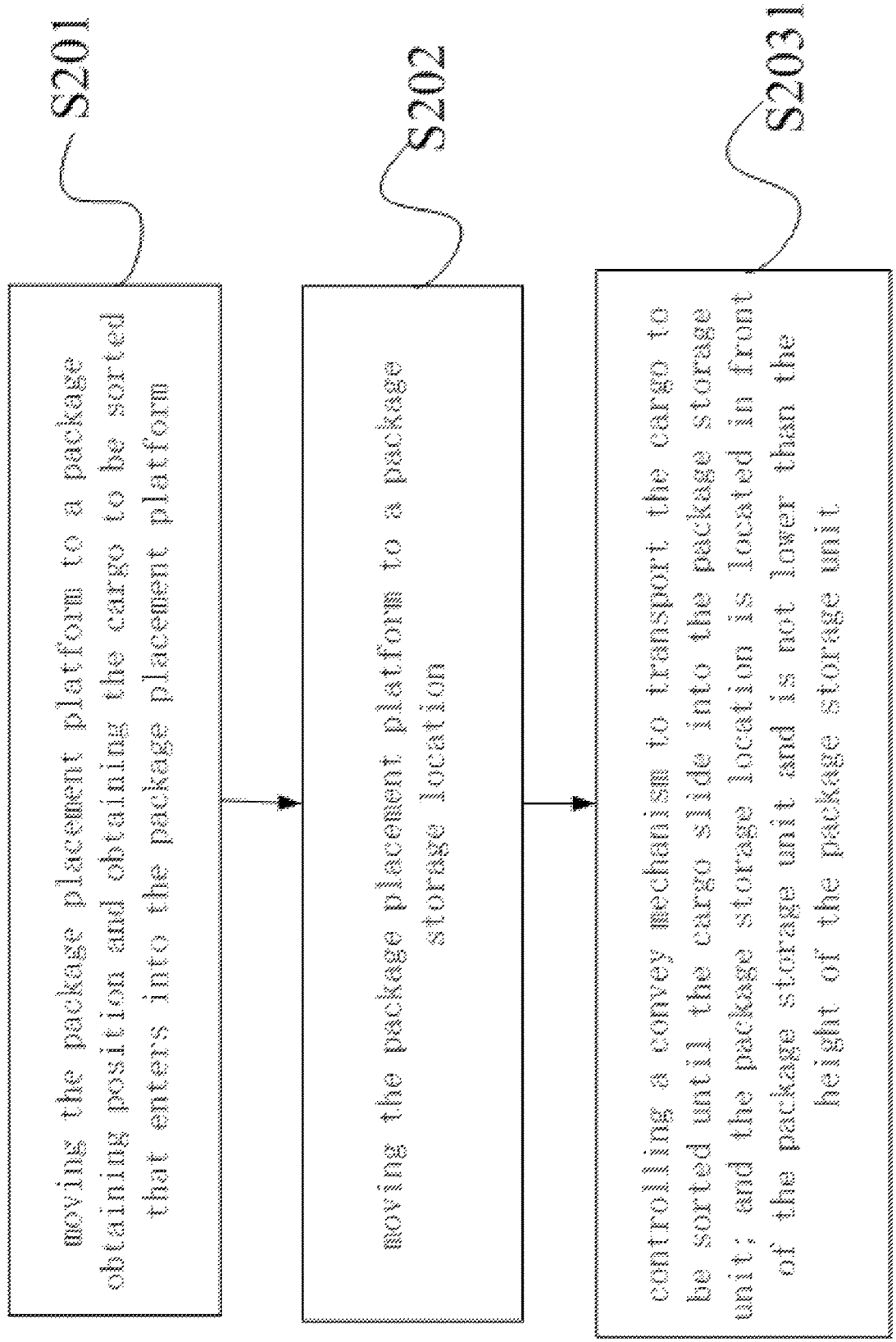
FIG. 8 is a flow schematic diagram of the cargo sliding into a package storage unit according to an embodiment of the present invention.

In some implementations, referring to FIG. 8, in the step 203, after the package placement platform is moved to the package storage location, the method further includes:

2031: controlling a convey mechanism to transport the cargo to be sorted until the cargo slide into the package storage unit; and the package storage location is located in front of the package storage unit and is not lower than the height of the package storage unit.

In some implementations, after the package placement platform is moved to the package storage location, the method further includes:

2032: controlling the movable baffle to open so that the cargo can enter into the package storage unit from the package placement platform.

Practically, after the package placement platform is moved to the package storage location, the position of height of the package placement platform is not lower than that of a selected layer of the package storage unit. Moreover, the the movable baffle arranged at the front of package placement platform is moved down to open and at the some time, the convey mechanism is activated to transport the cargo along a direction from the second position of the package placement platform to the first position of the package placement platform until the cargo slides into the corresponding package storage unit and in this manner, it finishes the cargo sorting process.

Through the above steps, the method can facilitate the cargo sliding into the package storage unit more quickly through the convey mechanism exerting the first force to the cargo to be sorted.

Figure 9:
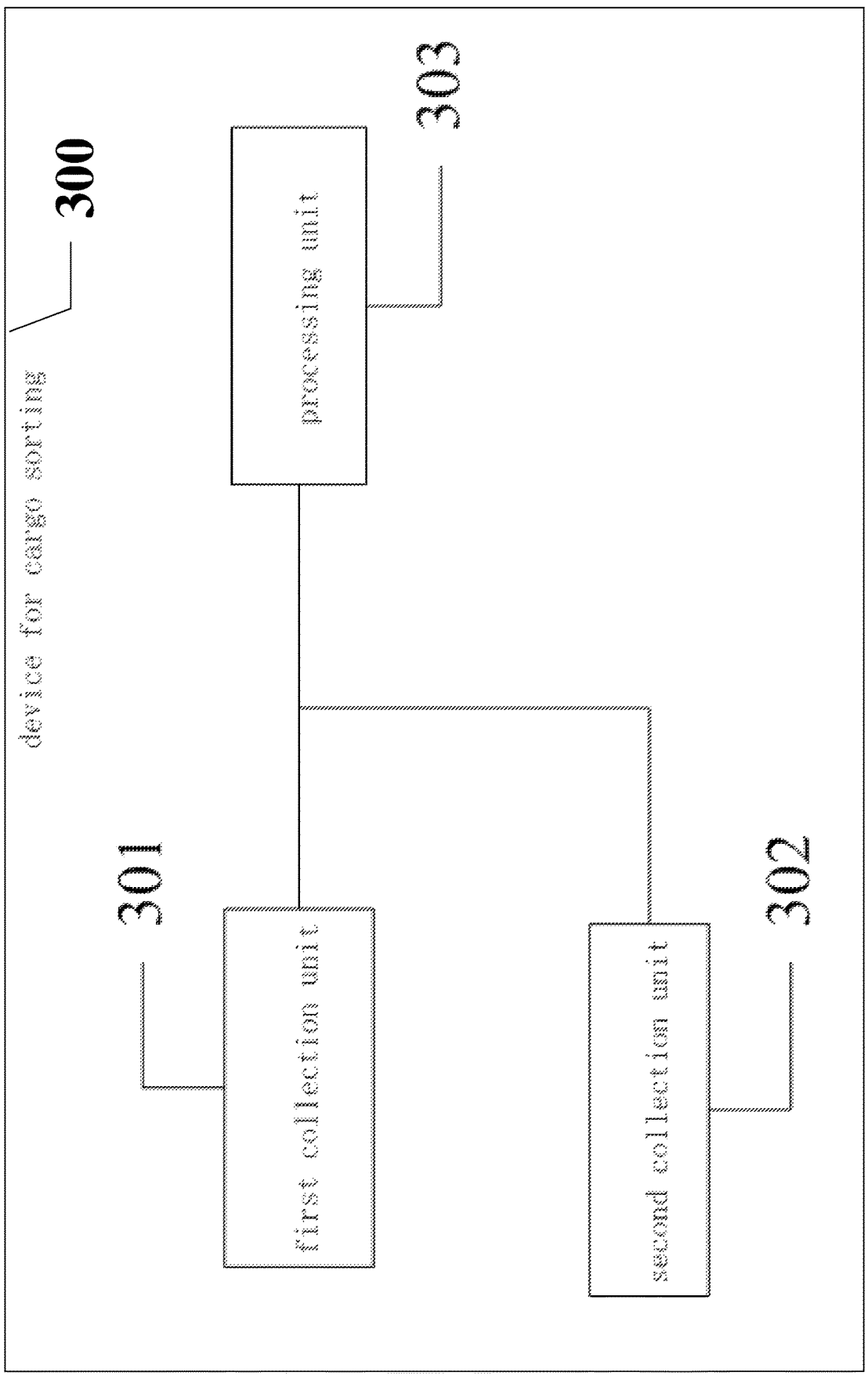
FIG. 9 is a structural schematic diagram of a device for cargo sorting according to an embodiment of the present invention.

Referring to FIG. 9, based on the above embodiments, a device 300 for cargo sorting provided by this embodiment is configured to control an end effector with a package placement platform to sort the cargo, and the device comprises: a first collection unit 301, configured to collect location information of the cargo; a second collection unit 302, configured to collect cargo location information and space information of a package storage unit; and a processing unit 303, configured to execute the method as above.

Figure 10:
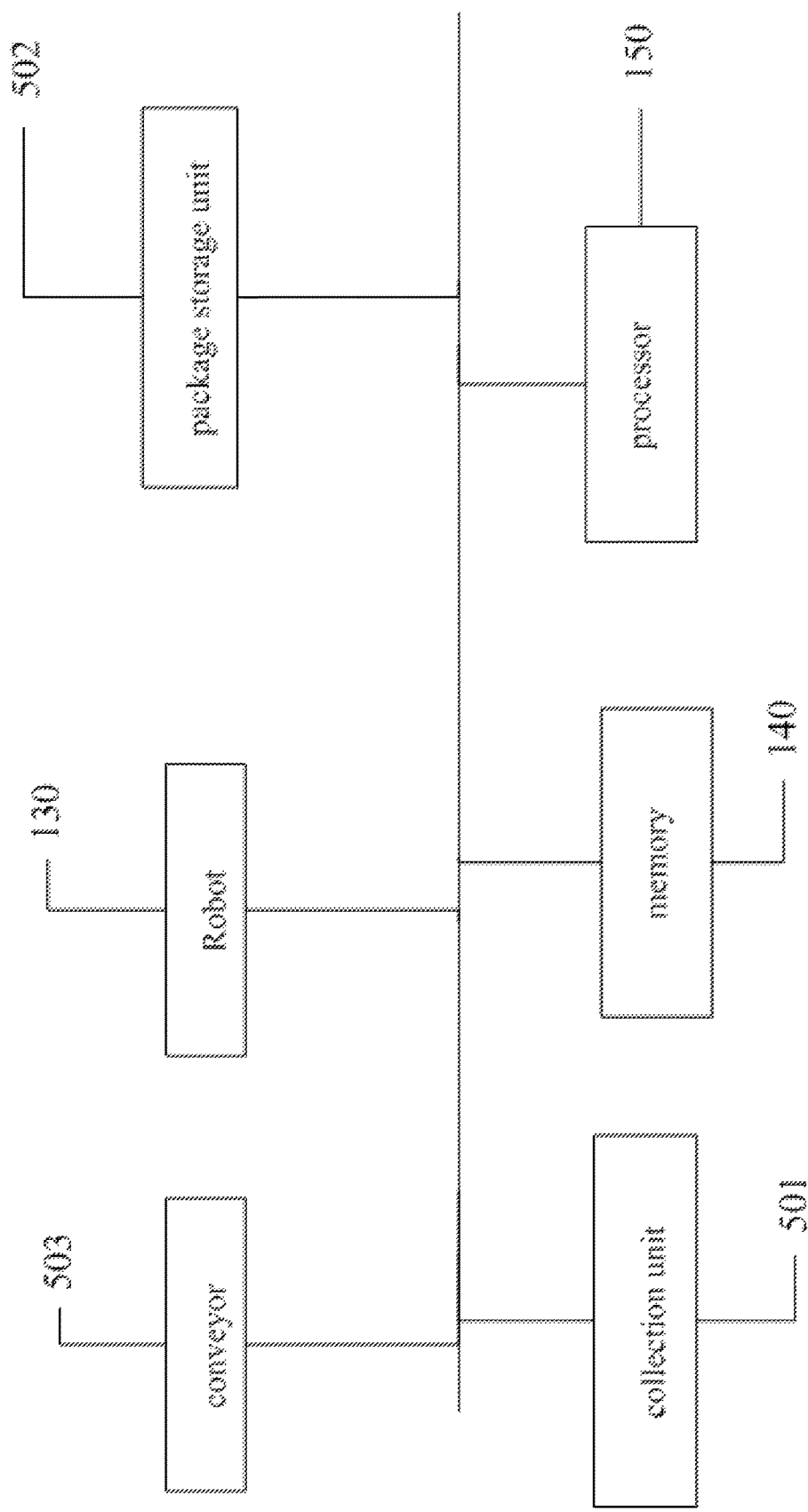
FIG. 10 is a structural schematic diagram of a system for cargo sorting according to an embodiment of the present invention.
Figure 11:
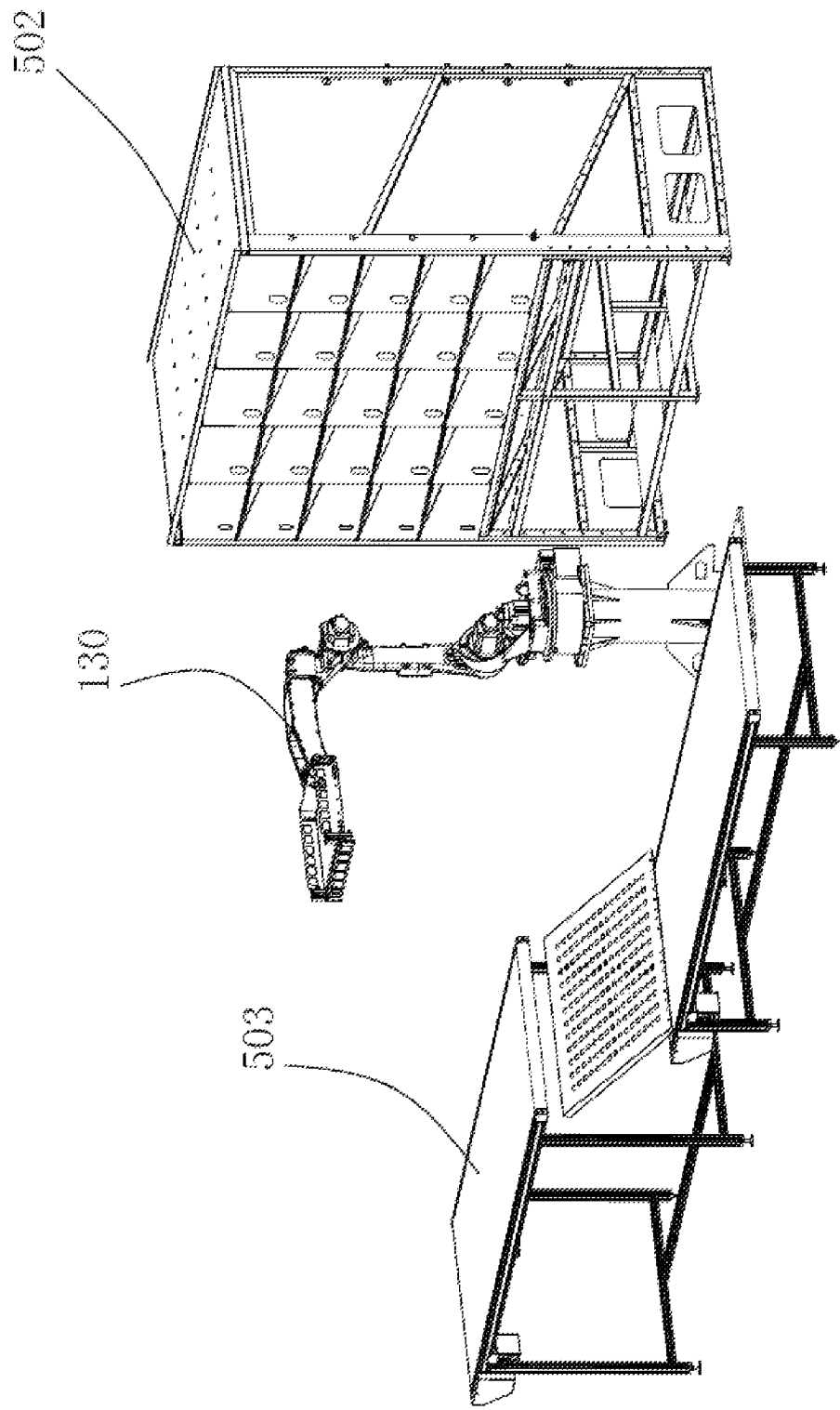
FIG. 11 is a three-dimensional structure schematic diagram of a system for cargo sorting according to an embodi-

Referring to FIG. 10 and FIG. 11, based on the above embodiments, a system for cargo sorting provided by this embodiment, comprises: a robot 130, a collection unit 501, a package storage unit 502, a conveyor 503, a memory 140 and a processor 150. And the robot 130 is configured to sort the cargo; the collection unit 501 is configured to collect information; the package storage unit 502 is configured to store the cargo; the conveyor 503 is configured to transport the cargo; the memory 140 is configured to storage a program; and the processor 150 is configured to call the program to execute calculating both a location of the package placement platform and a storing position of the cargo based on the information of the cargo and the location of the cargo. In addition, the processor is configured to call the program to execute calculating a moving position of the package placement platform and a moving position of the movable baffle according the position of the cargo located on the first transmission mechanism. Moreover the processor is configured to call the program to control the robot arm to move in order to sort the cargo into a corresponding destination based on the information of the cargo.

More specific, the processor is configured to execute the following steps: moving a package placement platform to a package obtaining position and obtaining the cargo to be sorted that enters into the package placement platform; moving the package placement platform to a package storage location; and exerting a first force to push the cargo into the package storage unit.

In addition, exerting the first force to push the cargo into the package storage unit includes: controlling a convey mechanism to transport the cargo to be sorted until the cargo slides into the package storage unit; and the package storage location is located in front of the package storage unit and is not lower than the height of the package storage unit.

Moreover, after obtaining the cargo to be sorted that enters into the package placement platform, the system further includes: controlling the convey mechanism to transport the cargo to be sorted in order to move the cargo from a first position of the package placement platform to a second position of the package placement platform.

In some implementations, moving the cargo from the first position of the package placement platform to the second position of the package placement platform further includes: controlling the convey mechanism to move the cargo to the second position of the package placement platform when a third sensor arranged in the first position of the package placement platform detects the cargo; and controlling the convey mechanism stopping transporting the cargo when a fourth sensor arranged in the second position of the package placement platform detects the cargo. After moving the cargo from the first position of the package placement platform to the second position of the package placement platform, the system further includes: controlling a movable baffle arranged on the front side of the package placement platform to close in order to prevent the cargo from sliding down the package placement platform.

Through the above steps, the system can facilitate the package placement platform receiving and transporting the cargo with the help of the package placement platform receiving different types of the cargoes.

The processor is configured to implement actions performed by any processing unit 303 in FIG. 9 in order to implement the actions of the robot provided in the embodiment shown in FIG. 1. It should be noted that the device for cargo sorting may include one or more processors, and the structure of the device for cargo sorting does not constitute a limitation to the embodiment of the present invention.

Based on the above embodiments, a computer readable storage medium provided by this embodiment, comprises: computer program codes stored on the computer readable storage medium, when the computer program codes run on the computer, the computer executes the methods as above.

It is to be understood that in this article, the term "include", "include" or any other variant thereof is intended to cover non-exclusive inclusion, so the process, method, article or device that includes a series of elements includes not only those elements, but also other elements that are not expressly listed, or elements that are inherent to such processes, methods, objects or devices. Without further limitation, a limited element defined by the phrase "including one . . . " does not exclude the presence of additional identical elements in a process, method, article, or device that include such elements.

Through the description of the above embodiments, it is clear to those skilled in the art that the above embodiments can be implemented by means of software plus the necessary general hardware platform, and of course, can be implemented by means of hardware, but in many cases the former is a better implementation. Based on such understanding, the technical solution of the embodiment of the invention, or the part contributing to the prior art, may be expressed in the form of a software product. This computer software product is stored in a storage medium such as ROM/RAM, disk, CD-ROM, Includes instructions for a terminal (which may be a mobile phone, computer, server, air conditioner, or network device) to perform the methods described in each embodiment of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for cargo sorting, configured to control an end effector with a package placement platform to sort the cargo, wherein the method includes:
   moving the package placement platform to a package obtaining position and obtaining the cargo to be sorted that enters into the package placement platform;
   moving the package placement platform to a package storage location;
   exerting a first force to push the cargo into a package storage unit;
   after obtaining the cargo to be sorted that enters into the package placement platform, the method further includes:
   controlling the convey mechanism to transport the cargo to be sorted in order to move the cargo from a first position of the package placement platform to a second position of the package placement platform;
   after moving the cargo from the first position of the package placement platform to the second position of the package placement platform, the method further includes:
   controlling a movable baffle arranged on a front side of the package placement platform to close in order to prevent the cargo from sliding down the package placement platform.

2. The method as defined in claim 1, exerting the first force to push the cargo into the package storage unit includes:
   controlling a convey mechanism to transport the cargo to be sorted until the cargo slide into the package storage unit;
   wherein the package storage location is located in front of the package storage unit and is not lower than the height of the package storage unit.

3. The method as defined in claim 1, after moving the package placement platform to the package storage location, the method further includes:
   controlling the movable baffle to open so that the cargo can enter into the package storage unit from the package placement platform.

4. The method as defined in claim 1, moving the package placement platform to the package storage location further includes:
   obtaining space information of the package storage unit;
   determining a relative height difference between the package storage location and the height of the package storage unit based on the space information of the package storage unit.

5. The method as defined in claim 4, wherein obtaining the relative height difference by selecting from a plurality of preset height values.

6. The method as defined in claim 1, obtaining the cargo to be sorted that enters into the package placement platform further includes:
   exerting a second force to move the cargo into the package placement platform located in the package obtaining position.

7. The method as claimed in claim 6, exerting the second force further includes:
   controlling a first transmission platform to transport the cargo to be sorted until the cargo slides into the package placement platform;
   wherein the package obtaining position is located in a front of the first transmission platform and not higher than the cargo.

8. A computer readable storage medium, comprising: computer program codes stored on the computer readable storage medium, when the computer program codes run on a computer, the computer executes the method as claimed in claim 1.

9. The method as defined in claim 7, wherein when the cargo enters into the front side of the first transmission platform, a first sensor detects the cargo and feeds back a detection signal to a controlling system so that the controlling system controls the first transmission platform to transport the cargo until a second sensor detects the cargo; then the controlling system controls the first transmission platform stopping transportation when the second sensor feeds back another detection signal to the controlling system.

10. The method as defined in claim 9, moving the cargo from the first position of the package placement platform to the second position of the package placement platform further includes:
    controlling the convey mechanism to move the cargo to the second position of the package placement platform when a third sensor arranged in the first position of the package placement platform detects the cargo;
    controlling the convey mechanism stopping transporting the cargo when a fourth sensor arranged in the second position of the package placement platform detects the cargo.

* * * * *